United States Patent
Douglas

(10) Patent No.: US 10,787,155 B2
(45) Date of Patent: Sep. 29, 2020

(54) DEVICE FOR DISPENSING CHEMICAL ONTO A TIRE BRUSH

(71) Applicant: Michael Douglas, Nashville, TN (US)

(72) Inventor: Michael Douglas, Nashville, TN (US)

( * ) Notice: Subject to any disclaimer, the term of this patent is extended or adjusted under 35 U.S.C. 154(b) by 174 days.

(21) Appl. No.: 16/190,175

(22) Filed: Nov. 14, 2018

(65) Prior Publication Data
US 2019/0077381 A1 Mar. 14, 2019

Related U.S. Application Data

(63) Continuation of application No. 15/484,281, filed on Apr. 11, 2017, now abandoned, which is a continuation-in-part of application No. 15/216,348, filed on Jul. 21, 2016, now Pat. No. 9,650,021.

(60) Provisional application No. 62/336,320, filed on May 13, 2016.

(51) Int. Cl.
  *B60S 3/04* (2006.01)
  *A46B 13/04* (2006.01)
  *A46B 13/00* (2006.01)

(52) U.S. Cl.
  CPC ............ *B60S 3/042* (2013.01); *A46B 13/001* (2013.01); *A46B 13/04* (2013.01); *A46B 2200/3046* (2013.01)

(58) Field of Classification Search
  CPC . B60S 3/042; A46B 13/04; A46B 2200/3046; B08B 1/04
  USPC .................................................. 15/53.1–53.4
  See application file for complete search history.

(56) References Cited

U.S. PATENT DOCUMENTS

| | | | |
|---|---|---|---|
| 2,636,198 A | 4/1953 | Wilson | |
| 2,730,738 A | 1/1956 | Humes | |
| 2,854,680 A | 10/1958 | Wilson | |
| 2,865,034 A | 12/1958 | Petite | |
| 3,035,293 A | 5/1962 | Larson | |
| 3,134,117 A | 5/1964 | Frank et al. | |
| 3,274,637 A | 9/1966 | Schulze | |
| 3,346,895 A | 10/1967 | Consolo | |
| 3,441,355 A | 4/1969 | Brown | |
| 5,216,774 A | 6/1993 | Hill et al. | |
| 8,109,227 B2 | 2/2012 | Tognetti et al. | |
| 8,142,092 B1 | 3/2012 | Fields | |
| 2007/0151054 A1* | 7/2007 | MacNeil | B60S 3/066 15/53.2 |
| 2008/0178402 A1* | 7/2008 | Martines | B60S 3/042 15/53.2 |

FOREIGN PATENT DOCUMENTS

DE    9318689 U1    3/1994

* cited by examiner

*Primary Examiner* — Mark Spisich
(74) *Attorney, Agent, or Firm* — 21st Century IP LLC; Kelly Hollowell

(57) ABSTRACT

A device for use in dispensing tire chemical onto a cylindrical car tire brush, comprising, an elongated shield having a concave inside surface having a curvature generally matching the outside curvature of the cylindrical brush, a port entering into the inside surface of the shield for receiving a chemical, and at least one distribution groove formed into the inside surface, which distribution groove communicates with the port and is inclined downwardly at an angle so as to distribute the chemical longitudinally along the said inside surface.

14 Claims, 5 Drawing Sheets

DEVICE FOR DISPENSING CHEMICAL ONTO A TIRE BRUSH

CROSS-REFERENCE TO RELATED APPLICATION

The present application is a Continuation of U.S. patent application Ser. No. 15/484,281, filed on Apr. 11, 2017, now abandoned, which is a Continuation in part of U.S. patent application Ser. No. 15/216,348, filed on Jul. 21, 2016, now U.S. Pat. No. 9,650,021, which claims the benefit of priority from U.S. Provisional Patent Application No. 62/336,320, filed on May 13, 2016, the contents of which are herein incorporated by reference in their entireties.

BACKGROUND OF THE INVENTION

The invention relates to commercial carwash equipment, specifically to tire washers and tire dressing and shining equipment. Automatic and drive through car washes often include rotary cylindrical-shaped tire brushes on each side of a car. The rotary tire brushes have bristles that extend outward from a center axis and are often made of polyethylene tubing, polypropylene or another stiff plastic and can have feathered plastic tips on the bristles. As a car passes through the carwash, the brushes rotate in a vertical direction, the axis of the cylindrical brushes being perpendicular to the direction of the vehicle's motion. This allows the brush to coat the tires in a multidirectional fashion as the tires rotate for better coverage.

Current tire brushes often include sprayers, nozzles or other applicators that spray chemical onto the cylindrical brushes while a car is being washed or dried. These applicators are not ideal because they waste dressing chemicals, they clog easily, they do not evenly distribute the chemical along the brush, and they do not continuously keep chemical on the brushes. Additionally, when these brushes are not in use, the tire chemical drips off the brushes, wasting considerable amounts of tire chemical and causes the tire brush to be unevenly coated.

The tire chemical itself typically costs between $400 and $1000 per 30 gallon barrel. Additionally, when spilled in a carwash lane, the tire chemical is slippery and dangerous.

What is needed is a device that can distribute chemical evenly along a tire brush without any restriction points in the chemical delivery line while also limiting chemical waste and promotes even brush coating.

SUMMARY OF THE INVENTION

The device reduces wasted chemical and the quantity of chemical spilled on a car wash floor. The device also evenly distributes chemical across the bristles of a tire brush. In one embodiment, the device reduces chemical spills by ⅔ or more in a single car wash lane and reduces wear on tire brushes by evenly distributing tire chemical and reducing friction on the tire brush.

The device comprises a generally c-shaped cover or shield that covers approximately half or more of the circumference of a cylindrical tire brush over the length the tire brush. The shield has through-ports passing through it that open to chemical delivery ports on the inside surface of the shield. On the outside surface of the shield, the through-ports connect to chemical delivery hoses. The inside surface of the shield has chemical distribution grooves, redistribution grooves and collection grooves. These grooves act as channels to direct the flow of chemical across the entire surface of the tire brush and keep the chemical from spilling out of the shield on to the floor of the carwash lane. The c-shaped cover or shield design also eliminates reservoir trays that protrude on the underside of a brush toward the tire that are susceptible to damage from interference with the mechanical devices that propel a vehicle forward during the application process.

This design eliminates the industry standard of v-jet nozzles or pin hole manifolds (spray to brush applications) being used on a rotating brush that constantly clog due to the restrictive nature of their designs. The device does not clog because the chemical does not pass through a restrictive point while chemical is being back-splattered from a tire as it is applied to the tire brush.

These and other advantages of the invention will be further understood and appreciated by those skilled in the art by reference to the following written specification, claims and appended drawings.

DETAILED DESCRIPTION OF THE PREFERRED EMBODIMENT(S)

It is to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The device and method of applying chemical to a tire brush 5 using the device was designed to eliminate current problems that plague existing tire wash systems. This process applies dressing onto a tire brush 5 in a new method that is not subject to clogging (as current units and systems often do), promotes even distribution of chemical, and uses the rotation of the tire brush 5 to contain chemical on the brush during times when the tire brush 5 is not applying chemical to car tire.

The device is a supplemental or after market system that can be attached to a tire brush 5 and other tire wash systems that are widely used in the car washing industry. In operation, the device is attached to a retractable arm 3, which arm moves the tire brush to engage and treat a tire. When the tire brush has finished applying chemical, the retractable arm 3 moves the tire brush 5 out or away from the vehicle (and tire) being treated. Typically, two tire brushes work in tandem, one on either side of a vehicle as its tires are being treated. In one embodiment, the device is attached to the retractable arm 3 and moves with the tire brush. Once the tire brush 5 is retracted, in one embodiment, the device will apply chemical to the tire brush 5. When a horizontal rotary tire brush 5 is rotating, in one embodiment, the device disperses or applies tire chemical onto the tire brush 5. In one embodiment, the retractable arm 3 is a frame manufactured by AVW Company. In another embodiment, the arm is stationary and non-retractable.

Figure 1:
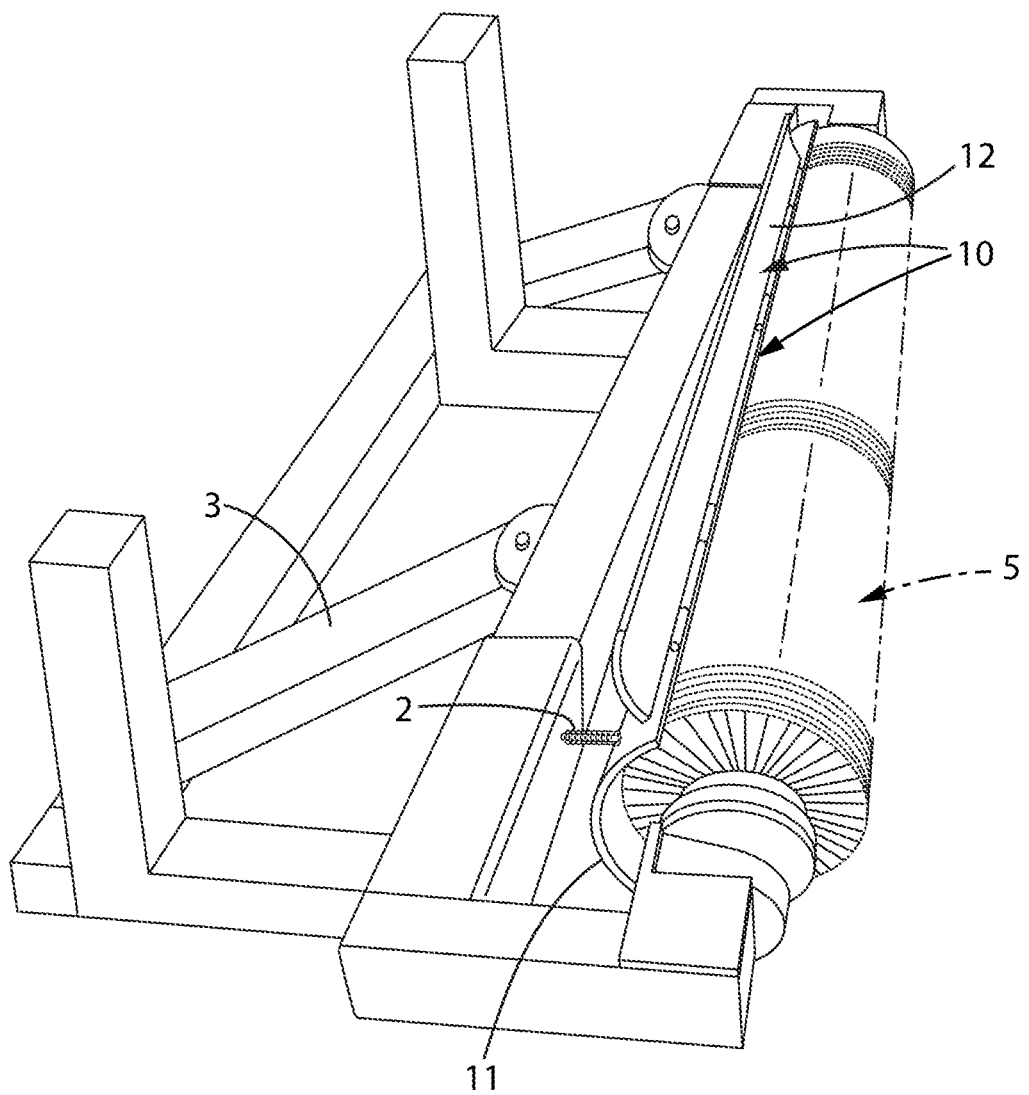
FIG. 1 is a perspective view of the device, with the access flap open, on a tire brush.

As shown in FIG. 1, the device is an applicator for tire wash brushes 5 and other rotary brushes. In one embodiment, the device is a tire shining apparatus comprising an elongated generally cylindrical brush 5 positioned to engage a car tire, a shield 10 extending around a side of the brush 5 opposite from the tire, and the tire brush 5 rotatable in a direction such that as it rotates, the tire brush 5 engages the bottom of the shield 10 and rotates up into the shield 10.

The device may be retrofitted to existing tire brushes and, in one embodiment, fits like a shield or splash guard over an industry standard tire brush 5. The device disperses or applies tire chemical onto the tire brush 5 while the tire brush 5 is rotating. In another embodiment, the device can apply chemical to the brush while the brush is idling or intermittently rotating, either during a pause between rotations or during rotation. Additionally, the device's shield can capture excess tire chemical and reapplies it to the tire brush 5 when the tire brush 5 rotates.

Shield and Shield Mount

In one embodiment, the device comprises a shield 10, which in cross section is generally c-shaped and can be a c-shaped molding (either CNC milled PVC or injection molded).

As shown in FIG. 1, the position of the device's shield 10 (the c formed molding) can be held to the frame or arm 3 with a floating bolt 2, the floating bolt having a spring pushing the device's shield 10 against tire brush 5. The shield 10 can also be held by other connectors capable of pushing the shield 10 against the tire brush 5, while still securing the shield to the frame 3. In one embodiment, the device shield fits a standard 96 inch tire brush. In another embodiment, the device shield fits a 103 inch tire brush. In other embodiments, the device can fit any length cylindrical brush.

Figure 2:
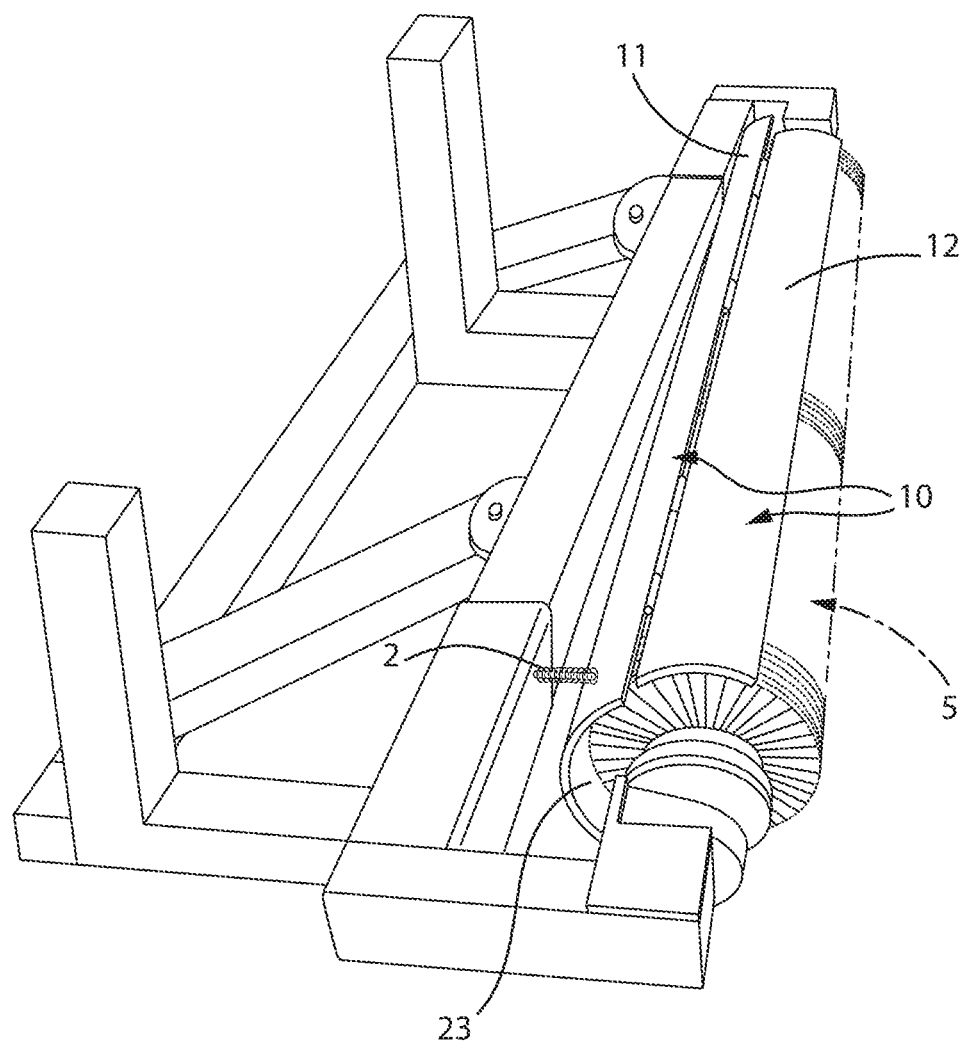
FIG. 2 is a perspective view of the device, with the access flap closed, on a tire brush.
Figure 3:
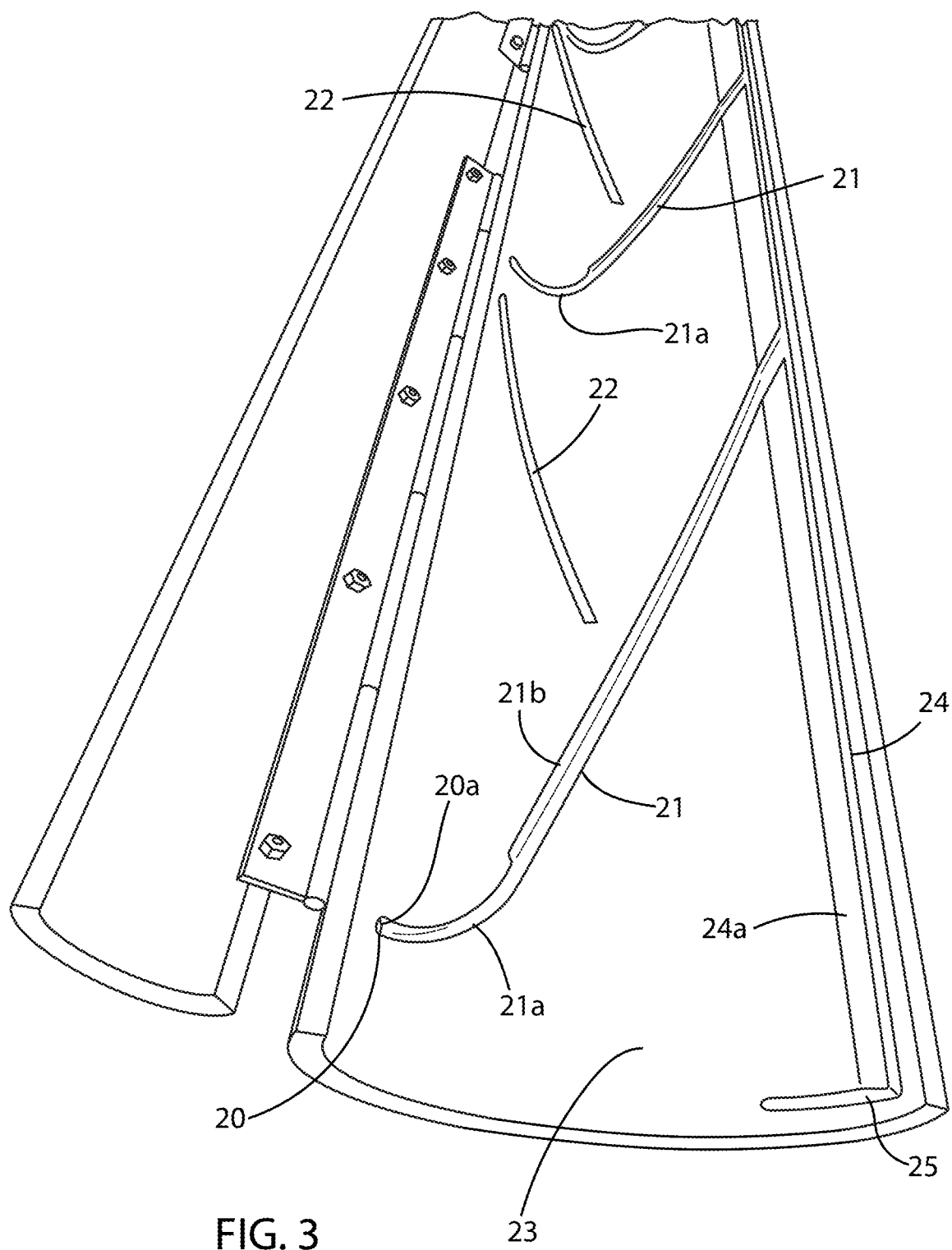
FIG. 3 is a view of the inside surface of the device, off of a tire brush.

As shown in FIGS. 2 and 3, the device comprises an elongated shield 10 (shown as a two part embodiment) having a concave inside surface 23. As shown in FIG. 2, the concave inside surface 23 generally matches the curvature of the outside curvature of the tire brush 5. In one embodiment, the device's shield 10 connects to the retractable arm 3 using a spring mount so that the shield is held against the brush even if the brush is worn down and the bristles become shorter.

As shown in FIGS. 1 and 2, in one embodiment, the shield 10 includes a main part 11 and a smaller access flap 12, which smaller access flap 12 is hinged to the main part 11. In such an embodiment, the access flap 12 is near the top of the shield 10, forming the top of the c-shape. In a two-part embodiment, the main part 11 attaches to the retractable arm 3. In one example, the main part 11 of the shield 10 extends for most of the curvature of the c-shape and the access flap 12 (hinged to the main port) completes the top of the curvature when closed (flipped down) and allows access to the top of the tire brush 5 and chemical dispensing port 20a when open (flipped up).

In a two-part embodiment, the shield 10 comprises a main part 11 extending for most of the shield's 10 curvature and an access flap 12 hinged to the main part 11. The combined shield 10 is open allowing the brush 5 inside the shield to receive a tire. In one embodiment, the access flap 12 is hinged to the main part 11 of the shield 10 so as to flip up and allow access to the brush 5 and chemical dispensing port 20a when not in use. In another embodiment, the shield 10 is a single piece forming the entire c-shape.

In one alternative embodiment, the shield can be omitted entirely or can be much smaller or skinnier. For example, in one embodiment, the shield can be arranged only to dispense and be just a few inches wide covering less of the circumference of the tire brush or, in another embodiment, the shield can be shortened so that it does not extend the entire length of the tire brush. In one embodiment, the shield does not extend under the bottom of the tire brush to avoid interfering with mechanical devices that propel a vehicle through the car wash lane.

Figure 4:
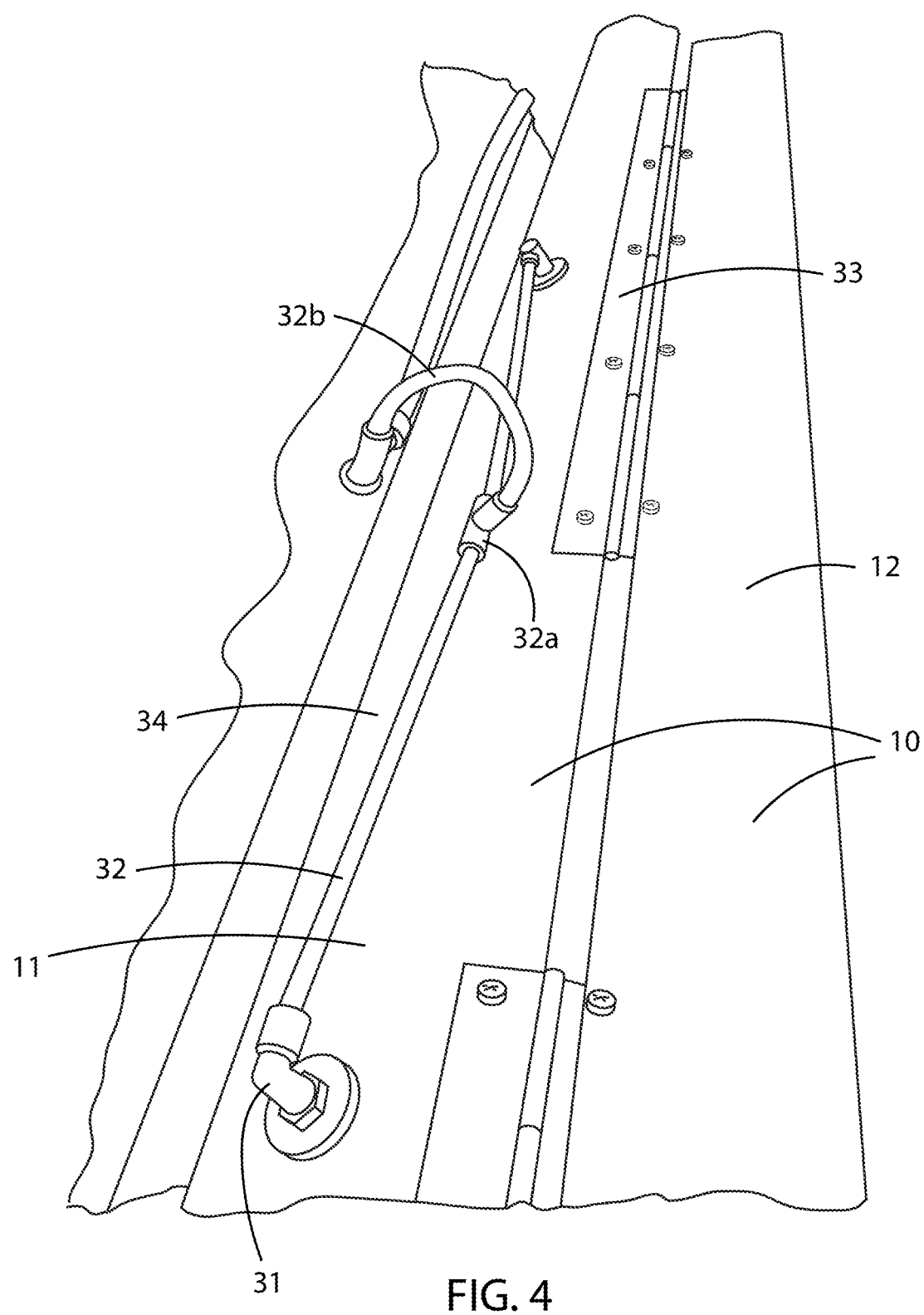
FIG. 4 is a view of the outside surface of the device, off of a tire brush.
Figure 5:
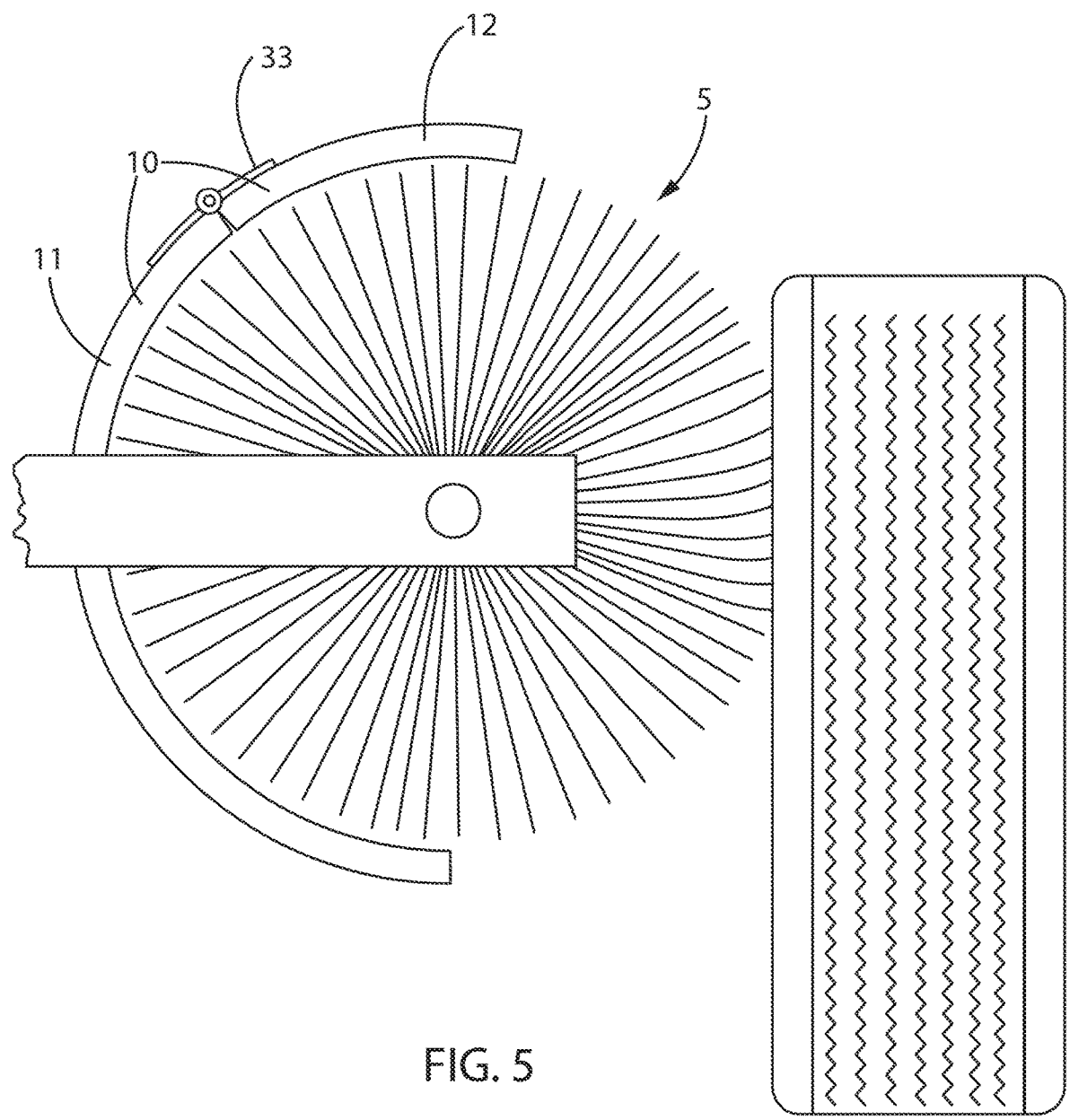
FIG. 5 is a side view of the device with a tire brush engaging a tire.

As shown in FIGS. 3 and 4 and discussed below, in addition to the shield, the device can comprise a chemical dispensing tube 32, a chemical through-port (through holes) 20 in the shield 10 of the device, a chemical distribution groove 21 on the inside surface 23 of the shield 10, and a chemical redistribution groove 22 on the inside surface 23 of the shield 10. In one embodiment, the device has multiple chemical dispensing tubes 32, multiple chemical through-ports 20, multiple chemical dispensing ports 20, multiple chemical distribution grooves 21, multiple chemical redistribution grooves 22 and/or multiple chemical collection grooves 24.

Distribution Tubes and Through-Ports

As shown in FIG. 4, in one embodiment of the device, a chemical dispensing tube 32 delivers chemical from a chemical pump. The chemical dispensing tube 32 can be any flexible tube, for example ¼ inch polyethylene tubing. The chemical dispensing tube 32 connects through a connector 31 (on the exterior face 34 or surface of the shield 10) to the chemical through-port 20 that opens to a port (or application hole) 20a on an interior face 23 or surface of the shield 10. The chemical through-port 20 is bored or cut through the shield 10 and can be a hole between the exterior surface 34 and an interior surface 23 of the shield 10. The chemical through-port 20 ends in a chemical dispensing port 20a.

In an embodiment without a shield, the chemical dispensing tubes 32 do not connect to a chemical through-port and can end in an open tube, a dispensing nozzle, a pin manifold or any other suitable applicator. In such an embodiment, the applicator is typically placed above the tire brush or, in an embodiment installed on a frame that retracts from a tire, above the tire brush when the brush is retracted away from a tire.

Dispensing Ports

As shown in FIG. 3, there is a chemical dispensing port 20a entering into the inside surface 23 of the shield 10. In one embodiment, the port 20a allows the inside surface 23 to receive tire chemical. In an embodiment with multiple dispensing ports 20a, each dispensing port 20a connects or adjoins a chemical distribution groove 21. In one embodiment there are multiple chemical dispensing ports 20a on the inside surface 23. The chemical dispensing ports 20a in such an embodiment are not restrictive, and do not include nozzles or pin manifolds. Instead they are wide open ports without a significant restriction from the through-ports 20, connectors 31, or the dispensing tubes 32.

In an embodiment without a shield, the chemical dispensing parts can be nozzles, pin manifolds, or other applicators configured to spray chemical on a tire brush when the brush is not engaging a tire. In an embodiment with a retractable brush, the applicators can be positioned to apply chemical when the brush is in retracted position. In one such embodiment, the nozzles or manifolds do not travel with the retractable arm so that they are less likely to become clogged while the brush is rapidly rotating and back-splattering when engaging a tire. In such an embodiment, a small shield can be positioned between the applicators and the tire brush when it is extended to prevent back-splatter from reaching the applicators.

Distribution Grooves

In one embodiment, shown in FIG. 3, each shield 10 comprises at least one chemical distribution groove 21 formed into the inside surface 23. As shown in FIG. 3, the chemical distribution groove 21 communicates with the chemical dispensing port 20a.

The chemical distribution groove 21 can be a groove cut into the inside surface 23 of the shield 10, starting at the chemical dispensing port 20a and extending at an angle downward from the chemical dispensing port 20a. The grooves can be manufactured in or cut from the c-shaped molding of the device. The downward angle of the chemical distribution groove 21 allows chemical to flow with gravity away from the chemical dispensing port 20a. The downward angle of the chemical distribution groove 21 can be calibrated between 0 degrees and 90 degrees from horizontal, in one embodiment the angle is between 20 degrees and 70 degrees from horizontal. The downward angle is calibrated to optimize travel of the chemical across the chemical distribution groove 21 as the chemical is swept into the tire brush 5. The downward angle should not be so steep that the chemical travels faster than it can be swept up by the tire brush 5. Additionally, the pressure and rate at which the chemical is pumped into the chemical dispensing tube 32 is calibrated to optimize travel of the chemical across the chemical distribution groove 21 before the chemical is swept into the tire brush 5.

In one embodiment, the chemical distribution groove 21 is inclined downwardly at an angle from the port 20a along the inside surface 23. In the embodiment shown in FIG. 3, the chemical distribution groove 21 has a curved neck 21a followed by a straighter portion, and the straighter portion of the chemical distribution groove 21 can be tapered 21b on one side to allow the tire brush 5 to easily sweep tire chemical out of the distribution groove. A person having ordinary skill in the art will recognize that the straighter portion of chemical distribution groove 21 is not actually straight because it is formed in the concave inside surface 23 of the shield 10.

In an embodiment with a skinnier shield, the chemical distribution groves 21 can be omitted or shortened to fit the shield.

Redistribution Grooves

As shown in FIG. 3, chemical redistribution grooves 22 can also be manufactured in or cut from the shield 10 of the device. The chemical redistribution grooves 22 can be placed at an upward angle compared to the angle of the chemical distribution grooves 21. This allows chemical to be pushed horizontally and redistributed across the interior face 23 of the shield 10 as the chemical is pushed upward by the rotating tire brush 5. The chemical redistribution groove 22 can be placed above at least part of the chemical distribution groove 21 to catch chemical being swept upward from the chemical distribution groove 21. In one embodiment, at least one chemical redistribution groove 22 is located above a distribution groove 21, and at least one chemical redistribution groove 22 is inclined upwardly to receive tire chemical carried by the tire brush 5 and to carry the tire chemical up along the inside surface 23 by a rotating brush 5. As the chemical is swept into the chemical redistribution groove 22 by a rotating tire brush 5, it is distributed across the interior face 23 of the shield 10 and applied to the brush 5. The upward angle of the chemical redistribution groove 22 can be calibrated between 0 degrees and 90 degrees from the horizontal, in one embodiment the angle is inclined upwardly at an angle of between 5 degrees and 45 degrees from the horizontal. The upward angle is calibrated to optimize travel of the chemical across the chemical redistribution groove 22 as it is swept by the tire brush 5. The upward angle should not be so steep that the chemical is not distributed horizontally but not so shallow that the chemical is simply trapped in the groove without being redistributed.

In one embodiment, the redistribution grooves can be omitted entirely or shortened.

Collection Groove

As shown in FIG. 3, in one embodiment, the shield 10 of the device also comprises a chemical collection groove 24 along the bottom of the inside surface 23 of the shield 10 to catch chemical running or flowing down the inside surface 23. In one embodiment, the collection groove 24 runs parallel with the axis of the tire brush 5. A chemical collection groove 24 can be placed horizontally across or along the bottom of the interior face (or surface) 23 of the shield or at another distance from the bottom.

In one embodiment, chemical distribution groove 21 connects and feeds into chemical collection groove 24. This allows chemical to flow freely from the chemical distribution groove 21 into the chemical collection groove 24. The chemical collection groove 24 catches chemical dripping down the interior surface 23 of the device and chemical dripping off of the tire brush 5. As the tire brush rotates, it sweeps chemical out of the chemical collection groove 24 back up the interior face 23 of the shield 10. In one embodiment, the chemical collection groove 24 is on the main part 11 of the shield 10. In one embodiment, one wall or side of the chemical collection groove 24 is tapered 24a to allow chemical to be easily swept out of the chemical collection groove 24 by the brush. At each end of the shield, the horizontal collection groove terminates in a short vertical groove 25. The short vertical groove 25 acts as a dam to stop chemical from dripping out the ends of the shield 10.

In one embodiment, the chemical collection grooves can be omitted entirely.

Pump

Most tire dressing machines apply chemical to the cleaning brush while the machine is treating a tire. In one embodiment of the device, the device applies chemical to the tire brush 5 while the tire brush 5 is not shining a tire, but is idling in the shield 10. This gives the chemical time to run down the device's distribution grooves 21 and distribute across the surface of the tire brush 5 better. In one embodiment, the chemical is applied to the tire brush 5 using a chemical pump. The pump pushes the chemical through a flexible tube 32 from an attached reservoir of chemical (e.g., a 30 gallon drum).

In one embodiment, the device rotates the tire brush using a hydraulic pump connected to the variable frequency drive. The hydraulic pump operates the motor when it pumps oil through a high pressure line attached to the hydraulic motor. In one embodiment, the hydraulic pump is connected to a hydraulic oil reserve tank, however, rather than the tank being attached vertically above the hydraulic pump (as is customary), the tank can be attached horizontally to the side of the pump. This arrangement allows the hydraulic pump of the device to remain primed with oil rather than requiring the pump to reprime itself each time it is activated. Repriming reduces the consistency of the pump, which reduces the consistency of the motor, which reduces the precision with which the variable frequency drive rotates the tire brush. By connecting the oil reserve tank horizontally, the rotation of the tire brush can be accurately measured by measuring the time the hydraulic pump is activated. In one embodiment, the device has a Viton pump with diaphragms and seals, or another industry standard pump that is designed to be impervious to caustic, alkaline, acidic, or other hazardous chemicals.

In one embodiment, each tire brush is rotated using electric motor(s) instead of a hydraulic pump. An electric motor can be attached to one end of the each brush or at both ends of each tire brush. Variable frequency drives can still be used to control the operation of the motors and to control the frequency, speed and duration of the brush's rotation when it is idling and operating.

The variable frequency drive controls the speed of rotation of the tire brush. The tire brush can be rotated downward with respect to the tire of a vehicle so that the brush moves in an upward direction against the interior surface of the device. By rotating the tire brush upward against the interior surface of the device, the brush will push unused chemical upward against the interior surface of the shield. Brush rotation can be induced by the variable frequency drive on a cyclic time table (typically rotating brush approximately 100 degrees periodically). By setting the variable frequency drive on a timer, the tire brush, while set to idle when it is not treating a tire, can be partially rotated to counteract gravity runoff of chemical from the tire brush. This is accomplished by the variable frequency drive partially turning the tire brush at set intervals to counteract, catch and/or redistribute chemical dripping off the tire brush.

In one embodiment, the variable frequency drive causes the tire brush to turn at consistent time intervals at a constant rotational velocity for random periods of time, causing the tire brush to stop at different locations. In another embodiment, the tire brush rotates at consistent time intervals at variable rotational velocity for random periods of time. In one embodiment, the variable frequency drive rotates the tire brush at least one quarter of a turn (90 degrees) each time it engages. In one embodiment, the variable frequency drive rotates the tire brush less than 360 degrees each time it engages. The device promotes even distribution of tire chemical on a tire brush by randomly stopping the brush's rotation. The device is designed to use any tire chemical on the market.

The variable frequency drive is connected to and controlled by a program logic controller (PLC), which is connected to and programmed by a human machine interface (HMI). The variable frequency drive of one embodiment can rotate the tire brush between 5 and 2500 rpm. In one embodiment, when the device is idling the brush, the variable frequency drive can cause the motor to rotate for between 1 and 30 second intervals followed by a pause in rotation for 15 to 240 seconds. In one embodiment, the variable frequency drive causes the motor to rotate between 0.5 and 30 second intervals followed by a pause. In one embodiment, the brush idles at an index speed of 800 rpm. In another embodiment, the brush idles at an index speed between 400 and 1200 rpm. In another embodiment, when idling, the variable frequency drive pauses the brush's rotation for approximately 48 seconds between each partial rotation. In one embodiment, the variable frequency drive turns the tire brush approximately 110 degrees during each partial rotation while the device is idling. In one embodiment, when idling, the variable frequency drive rotates the tire brush for approximately 1.1 seconds. When the tire brush is shining/treating a tire, the variable frequency drive can cause the motor to continuously rotate the tire brush at an optimal speed. In one embodiment, when the tire brush is applying chemical to a tire, the variable frequency drive can cause the motor to rotate the brush at 1800 rpm for approximately 3 seconds.

In one embodiment, two devices on either side of a vehicle are controlled by separate chemical pumps, one pump for each tire brush (each tire brush being on an opposite side of a vehicle). In one embodiment, multiple through-ports 20 are fed by a single pump. In such an embodiment, the dispensing tube 32 has a splitter 32a connecting smaller tubes with a larger portion of the dispensing tube and the size of the dispensing tube is reduced to keep the pressure and flow rate closer to constant across the split. For example, at one split, the tubing diameter can be reduced from ⅜ inch to ¼ inch. In one embodiment, the device has at least two through-ports per shield connected to at least two dispensing tubes splitting from a larger dispensing tube, the larger dispensing tube connecting to the chemical pump. The chemical dispensing ports 20a in the shield can be spaced out from the other chemical dispensing ports 20a to allow for even distribution of chemical on the tire brush 5. There are no interior restrictions in the dispensing tubing, through ports 20, connectors 31, or dispensing ports 20a, which design prevents clogging.

Method

When the device is in operation, the interior face 23 of the device is held against the tire brush 5 by a spring or other apparatus that allows for movement while holding the device on the brush's frame or arm 5. The device can calibrated to automatically pump chemical through the chemical dispensing tube 32 and through the chemical through-port 20 and out the chemical dispensing port 20a. The chemical then flows into a chemical distribution groove 21 that directs flow of the chemical to distribute the chemical onto the bristles of tire brush 5 as it turns.

One exemplary method for treating tires on a car with the device comprising the steps of rotating a cylindrical tire brush 5 about its axis as the tires of the car move along the brush (moving parallel to the axis of the tire brush 5), partially enclosing the brush 5 with a cylindrical shaped shield 10, with the shield 10 open toward the car tire, and delivering chemical from a pump through a chemical dispensing tube 32 on the exterior surface 34 of the shield 10 through a connector 31, through-port 20, and dispensing port 20a to the inside surface 23 of the shield 10 such that the chemical runs along the inside surface 23 of the shield 10 and is picked up by the rotating brush and carried around for cleaning the car tires.

In an embodiment of the device without a shield, the method for keeping chemical on a car wash tire brush can be accomplished by rotating the brush fast enough that chemical cannot drip off of it, but not so fast that the rotation will cause chemical to be thrown from the brush. One example of the method comprises the steps of: slowing the rotational velocity of a cylindrical tire brush about its axis when the tire brush is not engaging a tire; delivering chemical to the tire brush; and intermittently stopping and starting rotation of the tire brush. This method can be accomplished using the device's variable frequency drive to rotate the brush incrementally. Specifically, the device's chemical applicators can be configured to apply chemical when the tire brush is stopped or while it is rotating. One exemplary method includes the additional step of calibrating the speed of rotation and/or frequency of rotation to distribute chemical over the tire brush and keep the chemical from dripping off of the tire brush.

In one exemplary method of using the device, the method also includes a step wherein the chemical entering through the port 20a is received in distribution grooves 21 which are downwardly inclined along the inside surface 23 of the shield 10.

An additional step can comprise collecting the chemical moving up the shield 10 in a redistribution groove 22. Another additional step can comprise collecting chemical which has reached the bottom of the inside surface 23 of the shield 10 in a collection groove 24.

The method can further comprise the step of collecting chemicals running down the inside surface 23 of the shield 10 by the brush 5 as it turns in a direction such that its bristles first engage the bottom of the shield 10 and its chemical collection groove 24 and then move up the inside surface 23 of the shield 10.

Retrofit Kit

In one embodiment, the device is a carwash retrofit kit comprising: an hydraulic oil tank, an hydraulic oil pump, a hydraulic motor, a variable frequency drive, a program logic controller, a human machine interface, a tire chemical pump, chemical dispensing tubing, and a tire brush shield. In another embodiment, the device is a carwash retrofit kit comprising: one or more electric motors, a variable frequency drive, a program logic controller, a human machine interface, a tire chemical pump, chemical dispensing tubing, and a tire brush shield.

In another embodiment, the device is a carwash retrofit kit comprising: chemical dispensing tubing and a tire brush shield. In yet another embodiment, a retrofit kit comprises a tire brush shield. The shield of the kit can comprise one or more through-ports, dispensing ports, dispensing grooves and collection grooves. The kit's shield can also comprise one or more redistribution grooves above the distribution grooves and/or vertical grooves at the ends of the collection grooves.

In one embodiment without a shield, the device is a carwash retrofit kit comprising: an hydraulic oil tank, an hydraulic oil pump, a hydraulic motor, a variable frequency drive, a program logic controller, a human machine interface, a tire chemical pump, and chemical dispensing tubing. In another embodiment without a shield, the device is a carwash retrofit kit comprising: one or more electric motors, a variable frequency drive, a program logic controller, a human machine interface, a tire chemical pump, and chemical dispensing tubing.

In the foregoing description, it will be readily appreciated by those skilled in the art that modifications may be made to the invention without departing from the concepts disclosed herein. Such modifications are to be considered as included in the following claims, unless the claims by their language expressly state otherwise.

What is claimed is:

1. A car tire cleaning device comprising:
   A rotating cylindrical brush having an outside curvature that rotates about its axis;
   A delivery mechanism configured to deliver chemical to the outside curvature of the brush; and
   A variable frequency drive configured to intermittently stop and start rotation of the tire brush and calibrate the speed and frequency of rotation of the tire brush to keep chemical from dripping off of the outside curvature of the tire brush.

2. The device of claim 1, wherein, the tire brush rotates between about 5 and 2500 rpm when rotating.

3. The device of claim 2, wherein the tire brush rotates between about 0.5 and 30 seconds when rotating.

4. The device of claim 3, wherein the tire brush rotates less than 360 degrees when rotating to promote even distribution of tire chemical.

5. The device of claim 4, wherein the tire brush stops between 15 and 240 seconds when it stops rotating.

6. The device of claim 1, further comprising:
   an elongated shield having an inside curvature generally matching the outside curvature of the brush, said shield partially enclosing the brush; and
   at least one port, the chemical exiting the port into the inside surface of the shield such that the chemical runs along the inside surface of the shield and is picked up by the rotating brush.

7. The device of claim 6, further comprising at least one distribution groove formed into the inside surface of the shield and which the at least one distribution groove is downwardly inclined at an angle along the inside surface of the shield.

8. The device of claim 7, further comprising bristles on the brush that engage the shield and rotate up the inside surface of the shield to collect chemicals running down the inside surface of the shield as the brush turns.

9. The device of claim 8, further comprising at least one redistribution groove inclined upwardly and located above the distribution groove.

10. The device of claim 9, further comprising a collection groove that extends horizontally across the inside surface of the shield to catch chemical running down the inside surface.

11. The device of claim 9, wherein the redistribution groove is inclined upwardly at an angle of between about 5° and 45° from the horizontal.

12. The device of claim 7, wherein the distribution groove is inclined downwardly at an angle of between about 20° and 70° from the horizontal.

13. The device of claim 6, wherein the shield comprises a main part and an access flap hinged to the main part.

14. The device of claim 13, wherein the shield is a cylindrical c-shaped shield extending around a side of the brush opposite from another side of the brush facing a tire.

* * * * *